April 10, 1956  H. C. UREY  2,741,543
PROCESS FOR THE PRODUCTION OF DEUTERIUM OXIDE
Filed May 22, 1945
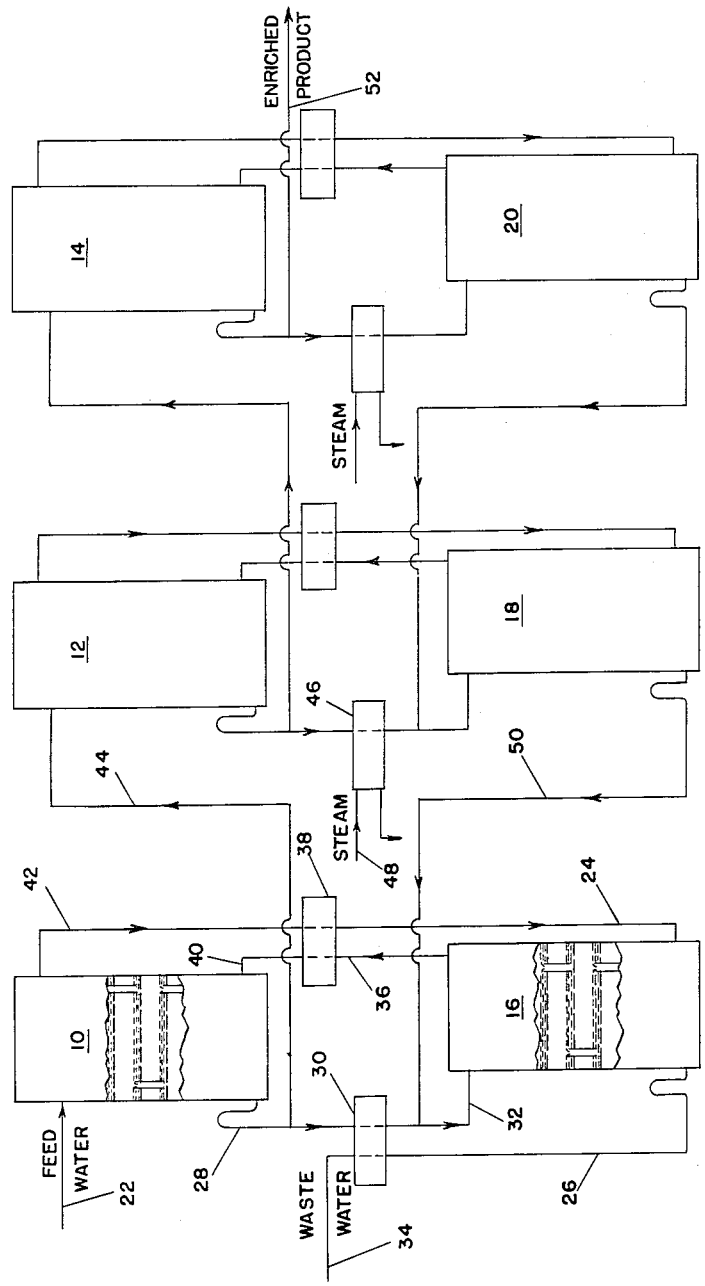
INVENTOR
HAROLD C. UREY
BY
ATTORNEY United States Patent Office 2,741,543
Patented Apr. 10, 1956

2,741,543

PROCESS FOR THE PRODUCTION OF DEUTERIUM OXIDE

Harold C. Urey, Leonia, N. J., assignor to the United States of America as represented by the United States Atomic Energy Commission Application May 22, 1945, Serial No. 595,196

19 Claims. (Cl. 23—204)

This invention relates to a deuterium concentration process and more particularly to an improved process for increasing the concentration of the deuterium-containing species in water by an exchange of hydrogen isotopes between water and certain compounds containing a hydrogen-sulfur bond.

It has been previously proposed to effect an increase in the concentration of the deuterium-containing species in water by utilizing the fact that there is a preferential equilibrium distribution of deuterium between water and certain other hydrogen-containing substances and that this preferential distribution varies with temperature. In accordance with one specific prior proposal the deuterium concentration in water is increased by means of an exchange reaction between liquid water and hydrogen sulfide gas in a countercurrent system comprising one or more pairs of stages with the two stages of each pair being maintained at different temperatures. Thus water containing, for example, the natural abundance of deuterium may be fed into the top of an exchange tower maintained at a relatively low temperature and caused to flow down through the low temperature tower, then into the top of a tower maintained at a relatively higher temperature and down through the high temperature tower. Hydrogen sulfide gas may be introduced at the bottom of the high temperature tower and caused to flow countercurrent to the water up through the high temperature tower and then up through the low temperature tower. Hydrogen sulfide from the top of the low temperature tower may be returned to the bottom of the high temperature tower to form a closed gas cycle and water from the bottom of the low temperature tower is rejected. The water and hydrogen sulfide are intimately mixed in each tower to cause an exchange of hydrogen isotopes to take place to an extent sufficient to establish isotopic equilibrium between the water and hydrogen sulfide.

In a system of this type deuterium tends to concentrate in the water between the two temperature stages. The nature of the hydrogen isotope equilibrium between the water and hydrogen sulfide is such that the water contains approximately twice as high a concentration of deuterium as does the hydrogen sulfide in contact with the water and the distribution of deuterium between the two materials varies with temperature. The ratio of the concentration of deuterium in water to the concentration of deuterium in hydrogen sulfide is larger at relatively low temperatures than it is at relatively high temperatures. Thus in a system of the type described the hydrogen sulfide in the hot tower tends to strip deuterium from the water in contact therewith and in the cold tower the hydrogen sulfide tends to give up deuterium to the water in contact therewith. The effect of these two reactions is to produce in the water between the two temperature stages a relatively high concentration of deuterium.

It has also been proposed that an exchange reaction as described be carried out using a mercaptan in place of hydrogen sulfide. One disadvantage that has been encountered in the operation of dual temperature hydrogen sulfide-water exchange systems arise out of the corrosive tendency of the hydrogen sulfide. An advantage of using mercaptans is that some of the mercaptans are liquids and therefore the exchange reaction may be carried out in the liquid phase at atmospheric pressure. It has been found that liquid-liquid mixtures of mercaptan and water have less tendency to corrode structural materials containing iron than do mixtures of hydrogen sulfide and water. Furthermore the equipment for carrying out the exchange reaction may be more compact where liquid-liquid mixtures are used because the total volume of the materials entering into the reaction is less. However the exchange rate of the exchange reaction between liquid mercaptans and liquid water is exceedingly slow; so slow in fact as to render the process impracticable in the absence of a catalyst.

It is an object of the present invention to provide an improved process for increasing the concentration of the deuterium-containing species in water.

It is another object of the invention to provide an improved process for effecting an increase in the concentration of the deuterium-containing species in water by means of an exchange reaction between water and a substance containing a hydrogen-sulfur bond.

It is still another object of the invention to provide a process of this character which is carried out under such conditions that the corrosive tendency of the reactants is reduced.

It is a still further object of the invention to provide a catalyst for increasing the exchange rate of the hydrogen isotopes between water and a substance containing a hydrogen-sulfur bond.

Other objects of the invention will be in part obvious and in part pointed out hereinafter.

The process of the present invention is based upon the discovery that the rate of exchange of hydrogen isotopes between water and a substance containing a hydrogen-sulfur bond may be substantially increased by the addition of a relatively small quantity of an alkali to the reactants. In one of its broader aspects the method of the invention comprises increasing the deuterium concentration in water by an exchange of hydrogen isotopes at two different temperatures between water and a substance selected from the group consisting of mercaptans and hydrogen sulfide. The mercaptans used preferably have at least three carbon atoms so that their volatility is sufficiently low to permit liquid-liquid exchange over a reasonable temperature range without the use of pressures higher than atmospheric pressure. This group of mercaptans includes, for example, isopropyl mercaptan, n-propyl mercaptan, butyl mercaptan, thiophenol and benzyl mercaptan. The use of an alkali also increases the exchange rate between water and the normally gaseous mercaptans such as methyl and ethyl mercaptan as well as the exchange rate between hydrogen sulfide and water, but for the reasons stated above a liquid-liquid exchange system is preferred. The use of an alkali serves the dual purpose of increasing the reaction rate of the exchange reaction and reducing the corrosiveness of the solution when in contact with iron-containing structural materials.

As conducive to a clearer understanding of the present invention it may be pointed out that the distribution coefficient for the hydrogen isotope exchange reaction between mercaptans and water is represented by the following expression:

$$\alpha = \frac{D/H \text{ (water)}}{D/H \text{ (mercaptan)}}$$

wherein:

α = the distribution coefficient.
D/H (water) = the ratio of deuterium to the other hydrogen isotope, sometimes called protium, in the water phase.
D/H (mercaptan) = the ratio of deuterium to protium in the mercaptan phase. This distribution coefficent varies inversely with temperature and the measured values of the coefficient for isopropyl mercaptan and water at several temperatures are given in the following table.

| Temp. in ° C. | α |
|---|---|
| 0 | 2.19 |
| 27 | 2.02 |
| 60 | 1.82 |
| 95 | 1.77 |

It is apparent that, assuming equilibrium distribution, the water phase in a mixture of water and mercaptan will contain a greater proportion of the total deuterium at low temperatures than it will at high temperatures. Hence by establishing a countercurrent flow of the mercaptan and water at two different temperatures a transfer of deuterium from the mercaptan to the water may be effected at the lower temperature and a transfer of deuterium from the water to the mercaptan at the higher temperature with the result that a relatively high concentration of deuterium will be built up in the water at a point between the temperature stages.

In order to point out more fully the nature of the present invention a preferred embodiment of the present method will be described with reference to the accompanying drawing which shows diagrammatically apparatus capable of carrying out the method of the invention. Referring to the drawing, numerals 10, 12 and 14 designate exchange towers which operate at a relatively low temperature, say 25° C. and the numerals 16, 18 and 20 designate exchange towers operating at a relatively higher temperature, say 50° C. The towers 10 and 16 are interconnected in such manner that a countercurrent flow of water and a mercaptan, e. g. isopropyl mercaptan, may be established therein. The flow of water and mercaptan through the first two towers 10 and 16 is, in general, as follows: Water is introduced into the top of the tower 10 through pipe 22 in the form of an aqueous solution of caustic soda containing about 0.1 mol per liter of caustic soda and flows downwardly through the towers 10 and 16. Isopropyl mercaptan is introduced through pipe 24 into the bottom of the hot tower 16 and flows upwardly therethrough then up through tower 10. The caustic soda solution leaves the bottom of tower 16 through pipe 26 and isopropyl mercaptan from the top of tower 10 is returned to the bottom of tower 16.

Considering the flow of the reacting materials in more detail the tower 10 may be a so-called "sieve-plate" tower which, as indicated in the drawing, comprises a series of horizontal perforated plates provided with down pipes from one plate to another. Such towers are known in the art and provide intimate contact between two countercurrently flowing liquids. In the tower 10 the upwardly flowing isopropyl mercaptan and downwardly flowing alkaline solution come into intimate contact with one another. An exchange of hydrogen isotopes takes place within the tower 10 of such a character that deuterium is transferred from the mercaptan to the aqueous solution to increase the deuterium concentration in the solution. The deuterium enriched solution leaves the bottom of tower 10 through pipe 28 and flows through heat exchanger 30 and pipe 32 to the top of hot tower 16. In the heat exchanger 30 the solution is heated by being brought into heat transfer relationship with the hot solution leaving the bottom of tower 16.

The tower 16 like the tower 10 is provided with a series of perforated plates to ensure intimate contact of the solution and the countercurrently flowing mercapan. Within the tower 16 an exchange of hydrogen isotopes takes place of such a character that deuterium is transferred from the aqueous solution to the mercaptan. Solution depleted with respect to deuterium passes out of the bottom of tower 16 through pipe 26, flows through the heat exchanger 30 wherein it gives up some of its sensible heat to the solution flowing from tower 10 to tower 16, and then leaves the system through pipe 34.

Mercaptan enriched with respect to deuterium leaves the top of tower 16 and flows through heat exchanger 38 and pipe 40 to the bottom of cold tower 10. Within the tower 10 the mercaptan gives up deuterium to the downwardly flowing solution and flows from the top of tower 10 through pipe 42 to the heat exchanger 38, thence through pipe 24 to the bottom of tower 16. Within the heat exchanger 38 the mercaptan from the top of the hot tower gives up a portion of its sensible heat to the mercaptan that flows from the top of the cold tower to the bottom of the hot tower. Thus the upwardly flowing mercaptan is cooled before it enters the cold tower and the downwardly flowing mercaptan is heated before it enters the hot tower. The flow of mercaptan is such as to form a closed cycle including tower 10, pipe 42, pipe 24, tower 16 and pipes 36 and 40.

Since deuterium passes from the mercaptan to the solution in tower 10 and from the solution to the mercaptan in tower 16 the two towers operate in such manner as to produce a relatively high concentration of deuterium at points between the two towers and therefore enriched product is preferably removed at a point between the two temperature stages. A portion of the solution flowing through pipe 28 is withdrawn through pipe 44 and flows to the top of cold tower 12 where it mixes with countercurrently flowing mercaptan in a manner similar to the operation of tower 10. From the bottom of cold tower 12 solution flows through the heat exchanger 46 wherein the solution is heated by steam supplied through pipe 48 and then enters the hot tower 18 where it again enters into an exchange reaction with countercurrently flowing mercaptan. Solution from the bottom of tower 18 is returned through pipe 50, to pipe 32 and the top of tower 16.

Solution that is further enriched with respect to deuterium is withdrawn at a point between the towers 12 and 18 and supplied to the top of the cold tower 14. The operation of towers 14 and 20 is similar to that of towers 12 and 18, respectively. It is to be understood that towers 14 and 20 are not necessarily the last towers in the countercurrent system, but that any desired number of pairs of hot and cold towers may be used. Deuterium enriched product is withdrawn from a point between the last two temperature stages of the countercurrent system, for example, from a point between the towers 14 and 20 through pipe 52.

It is to be understood that the foregoing description is illustrative only and that numerous changes may be made in both the process steps and the materials used. Any of various alkalis may be used to increase the exchange reaction rate although caustic soda and calcium hydroxide are usually preferred. Calcium hydroxide is preferably used as a saturated solution and is somewhat less effective than caustic soda. The preferred concentration of caustic soda for catalyzing the reaction usually lies between 0.01 and 0.5 mol per liter.

The numbers of pairs of exchange towers may be increased to give any desired enrichment. The magnitude of the temperature difference between the high and low temperature towers is not critical and some degree of enrichment may be obtained with very small temperature differences. However in order to achieve a practicable enrichment it is desirable to maintain a relatively large temperature difference between the towers, provided that in cases where the exchange reaction is carried out between two liquids the high temperature tower does not reach a temperature which causes excessive vaporization of the reactants.

From the above description it is apparent that the present invention provides an effective method of concentrating the deuterium-containing species in water. The use of an alkali accelerates the hydrogen isotope exchange rate between mercaptans and water to such an extent as to permit attainment of substantial equilibrium in a matter of seconds. It has been found for example that a mixture of isopropyl mercaptan and a 0.1 molar caustic soda solution attain 95% of equilibrium within 15 seconds or less. This exchange rate may be contrasted with data reported in the literature to the effect that the attainment of equilibrium between mercaptans and water (containing no added alkali) may require up to 10 hours.

The rapid exchange rate attainable with the present method makes possible the use of a relatively compact exchange system. Furthermore corrosion difficulties are minimized by the fact that the exchange may be carried out in the liquid phase and that the mixture is definitely alkaline. Thus the exchange towers and auxiliary equipment may be made of ordinary structural steel, if desired.

I claim:

1. The method of increasing the concentration of the deuterium-containing species in water which comprises establishing a countercurrent flow of a dilute aqueous solution of an alkali and a substance selected from the group consisting of mercaptans and hydrogen sulfide in a countercurrent system comprising at least two stages, mixing said substance and said solution intimately in each of said two stages to cause an exchange of hydrogen isotopes to take place between said substance and said solution, maintaining said two stages at different temperatures to produce different concentrations of deuterium in said aqueous solution in said two stages to cause the concentration of deuterium in said solution to become relatively high at a point between said temperature stages, and withdrawing at a point between said temperature stages solution that is enriched with respect to deuterium.

2. The method of increasing the concentration of the deuterium-containing species in water which comprises establishing a countercurrent flow of a mercaptan and a dilute aqueous solution of an alkali in a countercurrent system comprising at least two stages, mixing said mercaptan and said solution intimately in each of said two stages to cause an exchange of hydrogen isotopes to take place between said mercaptan and said solution, maintaining said two stages at different temperatures to produce different concentrations of deuterium in said aqueous solution in said two stages to cause the concentration of deuterium in said solution to become relatively high at a point between said temperature stages, and withdrawing at a point between said temperature stages solution that is enriched with respect to deuterium.

3. The method of increasing the concentration of the deuterium-containing species in water which comprises establishing a countercurrent flow of a liquid mercaptan and a dilute aqueous solution of an alkali in a countercurrent system comprising at least two stages, mixing said mercaptan and said solution intimately in each of said two stages to cause an exchange of hydrogen isotopes to take place between said mercaptan and said solution, maintaining said two stages at different temperatures to produce different concentrations of deuterium in said aqueous solution in said two stages to cause the concentration of deuterium in said solution to become relatively high at a point between said temperature stages, and withdrawing at a point between said temperature stages solution that is enriched with respect to deuterium.

4. The method of increasing the concentration of the deuterium-containing species in water comprising the steps of establishing a countercurrent flow of a dilute aqueous solution of an alkali and a substance selected from the group consisting of mercaptans and hydrogen sulfide in a countercurrent system comprising a plurality of pairs of stages, one stage of each pair being maintained at a relatively low temperature and the other stage of each pair being maintained at a relatively high temperature, mixing said substance and said solution intimately in each of said stages to cause an exchange of hydrogen isotopes to take place between said substance and said solution, withdrawing solution from a point between each pair of temperature stages and feeding it to the low temperature stage of the next succeeding pair of stages, withdrawing solution from the high temperature stage of each pair and re-introducing it into said system at a point between the next preceding pair of temperature stages, and withdrawing as product solution enriched with respect to deuterium at a point between the last pair of temperature stages of said countercurrent system.

5. The method of increasing the concentration of the deuterium-containing species in water comprising the steps of establishing a countercurrent flow of a mercaptan and a dilute aqueous solution of an alkali in a countercurrent system comprising a plurality of pairs of stages, one stage of each pair being maintained at a relatively low temperature and the other stage of each pair being maintained at a relatively high temperature, mixing said mercaptan and said solution intimately in each of said stages to cause an exchange of hydrogen isotopes to take place between said mercaptan and said solution, withdrawing solution from a point between each pair of temperature stages and feeding it to the low temperature stage of the next succeeding pair of stages, withdrawing solution from the high temperature stage of each pair and re-introducing it into said system at a point between the next preceding pair of temperature stages, and withdrawing as product solution enriched with respect to deuterium at a point between the last pair of temperature stages of said countercurrent system.

6. The method of increasing the concentration of the deuterium-containing species in water comprising the steps of establishing a counter-current flow of liquid mercaptan and a dilute aqueous solution of an alkali in a countercurrent system comprising a plurality of pairs of stages, one stage of each pair being maintained at a relatively low temperature and the other stage of each pair being maintained at a relatively high temperature, mixing said mercaptan and said solution intimately in each of said stages to cause an exchange of hydrogen isotopes to take place between said mercaptan and said solution, withdrawing solution from a point between each pair of temperature stages and feeding it to the low temperature stage of the next succeeding pair of stages, withdrawing solution from the high temperature stage of each pair and re-introducing it into said system at a point between the next preceding pair of temperature stages, and withdrawing as product solution enriched with respect to deuterium at a point between the last pair of temperature stages of said countercurrent system.

7. The method of increasing the concentration of the deuterium-containing species in water by establishing a countercurrent flow of a dilute aqueous solution of an alkali and a substance selected from the group consisting of mercaptans and hydrogen sulfide at two different temperature stages which comprises causing said solution to flow first through the low temperature stage and then through the high temperature stage, causing said substance to flow first through the high temperature stage and then through the low temperature stage, mixing said substance with said solution intimately in each of said two stages to cause an exchange of hydrogen isotopes to take place between said substance and said solution, continuously re-circulating said substance from said low temperature stage to said high temperature stage, withdrawing from said high temperature stage solution that is depleted with respect to deuterium, and withdrawing at a point between said temperature stages solution that is enriched with respect to deuterium.

8. The method of increasing the concentration of the deuterium-containing species in water which comprises establishing in a countercurrent system including at least two stages, a countercurrent flow of a dilute aqueous solution of caustic soda and a substance selected from the group consisting of mercaptans and hydrogen sulfide, mixing said substance and said solution intimately in each of said two stages to cause an exchange of hydrogen isotopes to take place between said substance and said solution, maintaining said two stages at different temperatures to produce different concentrations of deuterium in said aqueous solution in said two stages to cause the concentration of deuterium in said solution to become relatively high at a point between said temperature stages, and withdrawing at a point between said temperature stages solution that is enriched with respect to deuterium.

9. The method of increasing the concentration of the deuterium-containing species in water which comprises establishing in a countercurrent system including at least two stages, a countercurrent flow of an aqueous solution of calcium hydroxide and a substance selected from the group consisting of mercaptans and hydrogen sulfide, mixing said substance and said solution intimately in each of said two stages to cause an exchange of hydrogen isotopes to take place between said substance and said solution, maintaining said two stages at different temperatures to produce different concentrations of deuterium in said aqueous solution in said two stages to cause the concentration of deuterium in said solution to become relatively high at a point between said temperature stages, and withdrawing at a point between said temperature stages solution that is enriched with respect to deuterium.

10. The method of increasing the concentration of the deuterium-containing species in water which comprises establishing in a countercurrent system including at least two stages, a countercurrent flow of isopropyl mercaptan and a dilute aqueous solution of an alkali, mixing said mercaptan and said solution intimately in each of said two stages to cause an exchange of hydrogen isotopes to take place between said mercaptan and said solution, maintaining said two stages at different temperatures to produce different concentrations of deuterium in said aqueous solution in said two stages to cause the concentration of deuterium in said solution to become relatively high at a point between said temperature stages, and withdrawing at a point between said temperature stages solution that is enriched with respect to deuterium.

11. The method of increasing the concentration of the deuterium-containing species in water which comprises establishing in a countercurrent system including at least two stages, a countercurrent flow of methyl mercaptan and a dilute aqueous solution of an alkali, mixing said mercaptan and said solution intimately in each of said two stages to cause an exchange of hydrogen isotopes to take place between said mercaptan and said solution, maintaining said two stages at different temperatures to produce different concentrations of deuterium in said aqueous solution in said two stages to cause the concentration of deuterium in said solution to become relatively high at a point between said temperature stages, and withdrawing at a point between said temperature stages solution that is enriched with respect to deuterium.

12. The method of increasing the concentration of the deuterium-containing species in water which comprises establishing in a countercurrent system including at least two stages, a countercurrent flow of benzyl mercaptan and a dilute solution of an alkali, mixing said mercaptan and said solution intimately in each of said two stages to cause an exchange of hydrogen isotopes to take place between said mercaptan and said solution, maintaining said two stages at different temperatures to produce different concentrations of deuterium in said aqueous solution in said two stages to cause the concentration of deuterium in said solution to become relatively high at a point between said temperature stages, and withdrawing at a point between said temperature stages solution that is enriched with respect to deuterium.

13. The method of increasing the concentration of the deuterium-containing species in water which comprises establishing in a countercurrent system including at least two stages, a countercurrent flow of isopropyl mercaptan and a dilute aqueous solution of caustic soda, mixing said mercaptan and said solution intimately in each of said two stages to cause an exchange of hydrogen isotopes to take place between said mercaptan and said solution, maintaining said two stages at different temperatures to produce different concentrations of deuterium in said aqueous solution in said two stages to cause the concentration of deuterium in said solution to become relatively high at a point between said temperature stages, and withdrawing at a point between said temperature stages solution that is enriched with respect to deuterium.

14. The method of increasing the concentration of the deuterium-containing species in water which comprises establishing in a countercurrent system including at least two stages, a countercurrent flow of isopropyl mercaptan and an aqueous solution of calcium hydroxide, mixing said mercaptan and said solution intimately in each of said two stages to cause an exchange of hydrogen isotopes to take place between said mercaptan and said solution, maintaining said two stages at different temperatures to produce different concentrations of deuterium in said aqueous solution in said two stages to cause the concentration of deuterium in said solution to become relatively high at a point between said temperature stages, and withdrawing at a point between said temperature stages solution that is enriched with respect to deuterium.

15. The method of increasing the concentration of the deuterium-containing species in water which comprises establishing in a countercurrent system including at least two stages, a countercurrent flow of isopropyl mercaptan and an aqueous solution containing from about 0.01 to 0.5 mol per liter of caustic soda, mixing said mercaptan and said solution intimately in each of said two stages to cause an exchange of hydrogen isotopes to take place between said mercaptan and said solution, maintaining said two stages at different temperatures to produce different concentrations of deuterium in said aqueous solution in said two stages to cause the concentration of deuterium in said solution to become relatively high at a point between said temperature stages, and withdrawing at a point between said temperature stages solution that is enriched with respect to deuterium.

16. The method of increasing the concentration of the deuterium-containing species in water which comprises establishing in a countercurrent system including at least two stages, a countercurrent flow of isopropyl mercaptan and an aqueous solution containing about 0.1 mol per liter of caustic soda, mixing said mercaptan and said solution intimately in each of said two stages to cause an exchange of hydrogen isotopes to take place between said mercaptan and said solution, maintaining one of said stages at about 25° C. and the other of said stages at about 50° C. to produce different concentrations of deuterium in said aqueous solution in said two stages to cause the concentration of deuterium in said solution to become relatively high at a point between said temperature stages, and withdrawing at a point between said temperature stages solution that is enriched with respect to deuterium.

17. The method of increasing the concentration of the deuterium-containing species in water comprising the steps of establishing a countercurrent flow of a dilute aqueous solution of caustic soda and a substance selected from the group consisting of mercaptans and hydrogen sulfide in a countercurrent system comprising a plurality of pairs of stages, one stage of each pair being maintained at a relatively low temperature and the other stage of each pair being maintained at a relatively high temperature, mixing said substance and said solution intimately in each of said stages to cause an exchange of hydrogen isotopes to take place between said substance and said solution, withdrawing solution enriched with respect to deuterium from a point between each pair of temperature stages and feeding it to the low temperature stage of the next succeeding pair of stages, withdrawing solution depleted with respect to deuterium from the high temperature stage of each pair of stages and re-introducing it into said system at a point between the next preceding pair of temperature stages, and withdrawing as product solution enriched with respect to deuterium at a point between the last pair of temperature stages of said countercurrent system.

18. The method of increasing the concentration of the deuterium-containing species in water comprising the steps of establishing a countercurrent flow of an aqueous solution of calcium hydroxide and a substance selected from the group consisting of mercaptans and hydrogen sulfide in a countercurrent system comprising a plurality of pairs of stages, one stage of each pair being maintained at a relatively low temperature and the other stage of each pair being maintained at a relatively high temperature, mixing said substance and said solution intimately in each of said stages to cause an exchange of hydrogen isotopes to take place between said substance and said solution, withdrawing solution enriched with respect to deuterium from a point between each pair of temperature stages and feeding it to the low temperature stage of the next succeeding pair of stages, withdrawing solution depleted with respect to deuterium from the high temperature stage of each pair of stages and re-introducing it into said system at a point between the next preceding pair of temperature stages, and withdrawing as product solution enriched with respect to deuterium at a point between the last pair of temperature stages of said countercurrent system.

19. The method of increasing the concentration of the deuterium-containing species in water comprising the steps of establishing a countercurrent flow of isopropyl mercaptan and a dilute aqueous solution of caustic soda in a countercurrent system comprising a plurality of pairs of stages, one stage of each pair being maintained at a relatively low temperature and the other stage of each pair being maintained at a relatively high temperature, mixing said mercaptan and said solution intimately in each of said stages to cause an exchange of hydrogen isotopes to take place between said mercaptan and said solution, withdrawing solution enriched with respect to deuterium from a point between each pair of temperature stages and feeding it to the low temperature stage of the next succeeding pair of stages, withdrawing solution depleted with respect to deuterium from the high temperature stage of each pair of stages and reintroducing it into said system at a point between the next preceding pair of temperature stages, and withdrawing as product solution enriched with respect to deuterium at a point between the last pair of temperature stages of said countercurrent system.

No references cited.